(12) United States Patent
Atre et al.

(10) Patent No.: US 8,126,926 B2
(45) Date of Patent: Feb. 28, 2012

(54) DATA VISUALIZATION WITH SUMMARY GRAPHS

(75) Inventors: Medha Atre, Troy, NY (US); Seema Sundara, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 445 days.

(21) Appl. No.: 12/317,362

(22) Filed: Dec. 22, 2008

(65) Prior Publication Data
US 2010/0161680 A1   Jun. 24, 2010

(51) Int. Cl.
*G06F 7/00* (2006.01)
*G06F 17/30* (2006.01)
(52) U.S. Cl. ........................ 707/798; 707/803
(58) Field of Classification Search .................. 707/791, 707/792, 797, 798, 803, 804, 805, 790, 802
See application file for complete search history.

(56) References Cited

U.S. PATENT DOCUMENTS

| | | | | |
|---|---|---|---|---|
| 5,761,664 A | * | 6/1998 | Sayah et al. | 1/1 |
| 7,251,637 B1 | * | 7/2007 | Caid et al. | 706/15 |
| 7,835,578 B2 | * | 11/2010 | Cheng et al. | 382/176 |
| 7,870,155 B2 | * | 1/2011 | McDade et al. | 707/782 |
| 2006/0036620 A1 | * | 2/2006 | Bigwood et al. | 707/100 |
| 2006/0074836 A1 | * | 4/2006 | Gardner et al. | 706/60 |
| 2008/0240560 A1 | * | 10/2008 | Hibino et al. | 382/168 |
| 2010/0106752 A1 | * | 4/2010 | Eckardt et al. | 707/805 |
| 2010/0312747 A1 | * | 12/2010 | Stolte et al. | 707/602 |

* cited by examiner

*Primary Examiner* — Angela Lie
(74) *Attorney, Agent, or Firm* — Kraguljac Law Group, LLC

(57) ABSTRACT

Systems, methods, and other embodiments associated with visualizing data using summary graphs are described. One example method includes constructing a summary graph for display. The summary graph represents the data as a summary node having a plurality of property edges connected to the summary node. The summary node represents the set of values for the node in the data.

26 Claims, 13 Drawing Sheets

Get Representative for ITProfessional
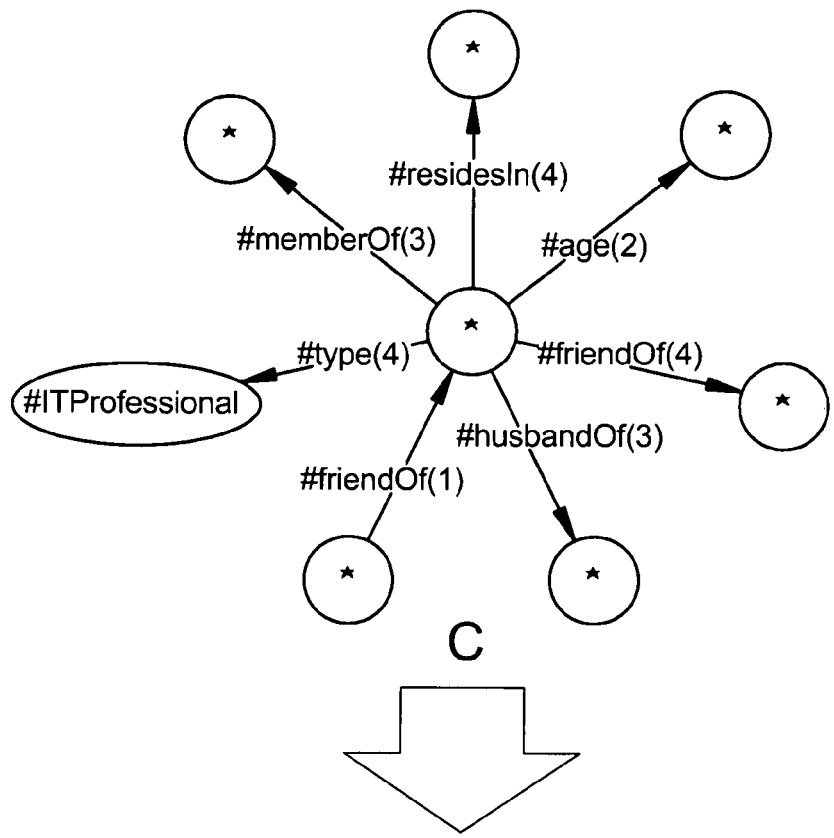
C
Get Particular Instance: Jack
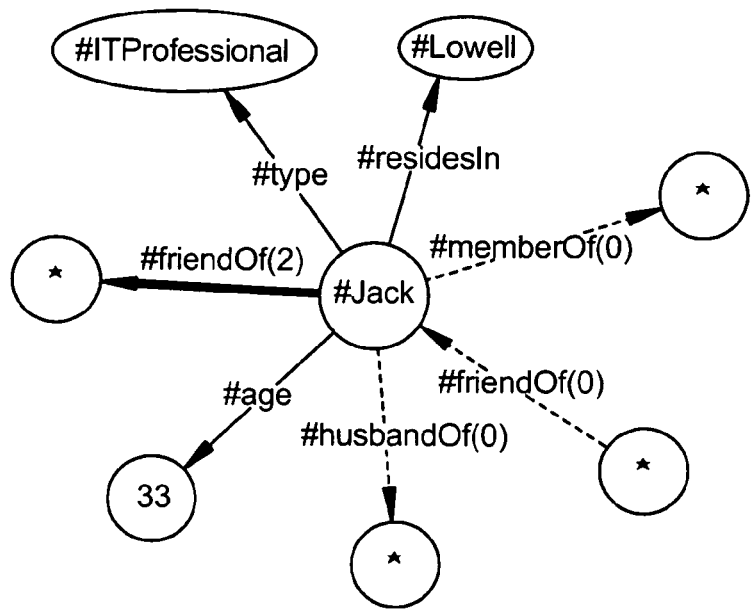
Figure 6 D

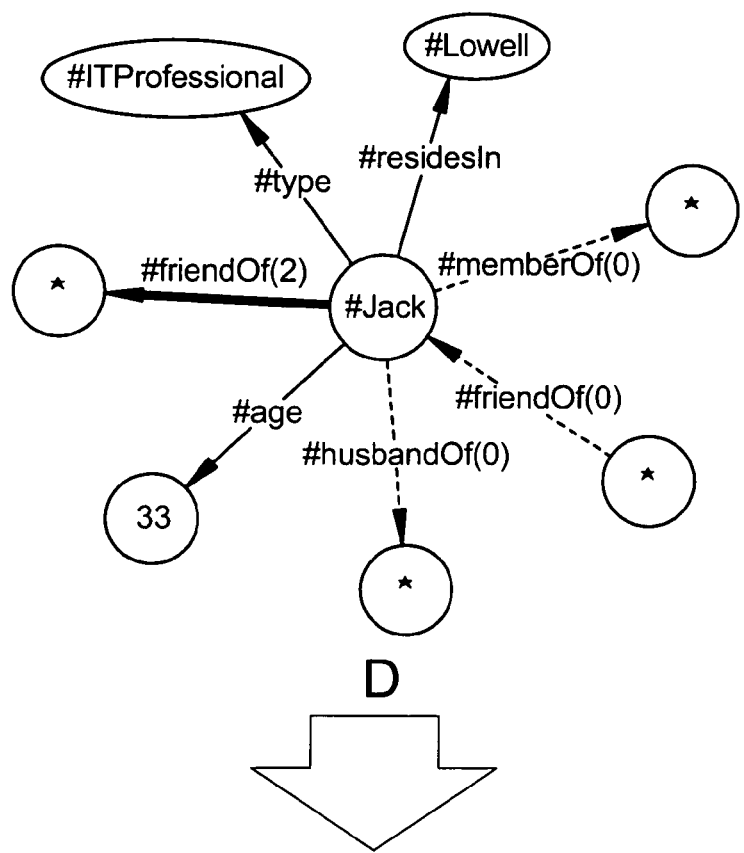
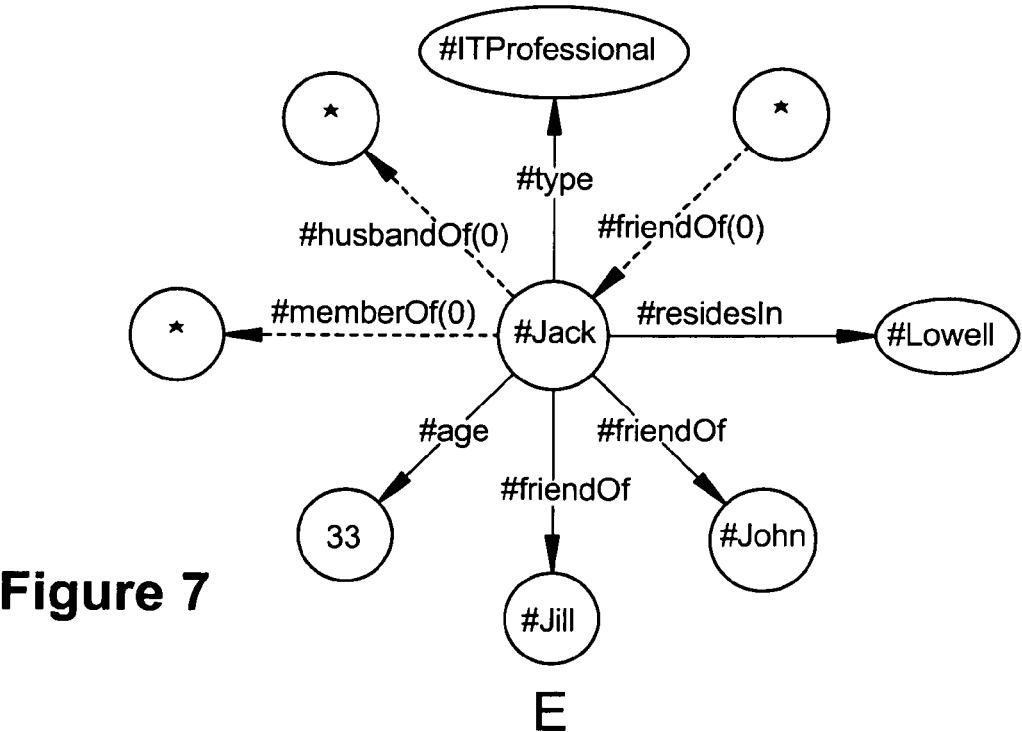
Figure 7

DATA VISUALIZATION WITH SUMMARY GRAPHS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

One common way to display data is in the form of trees or graphs. For large databases, it becomes difficult to display all of the data in a single screen. In addition, due to the clutter of data in the graph, it may be difficult for a user to interact with the data in a meaningful way. One approach to displaying a significant quantity of data in graph form is to present only a subset of the data, such as, for example, the results to a user query. However, with large databases, even subsets of data can be large enough to become difficult to display.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 illustrates another set of example embodiments of summary graphs.

FIG. 7 illustrates another set of example embodiments of summary graphs.

DETAILED DESCRIPTION

Figure 1:
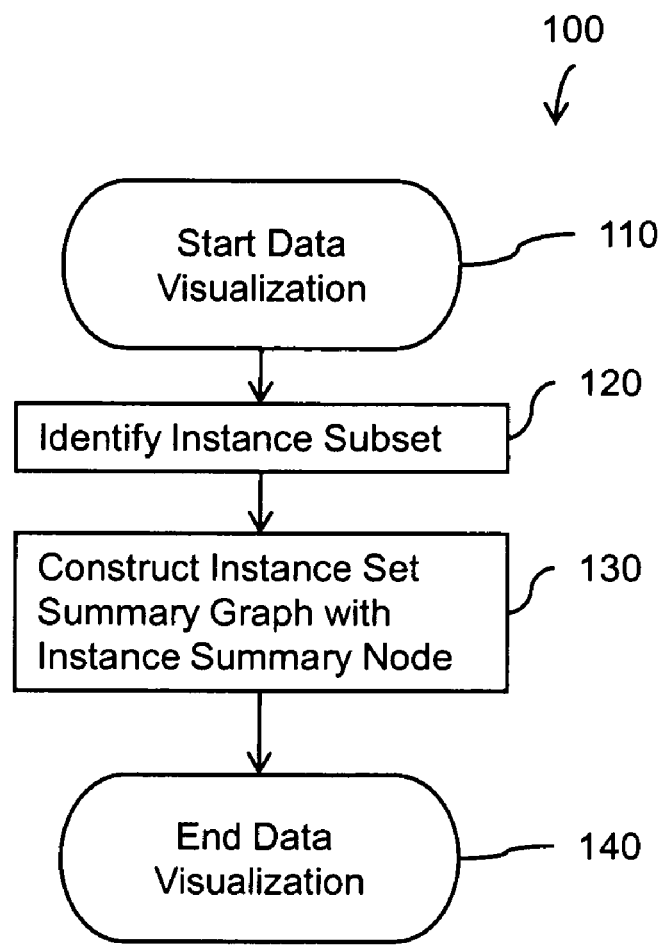
FIG. 1 illustrates one example embodiment of a method associated with visualizing data with summary graphs.

A visualizer that displays data instances, such as, for example, RDF triples, constructs summary graphs that collapse a plurality of data instances into summary graphs that include summary nodes and property edges. An instance set summary graph includes at least one summary node that represents the corresponding nodes for the summarized instances. In some cases the instance set summary graph includes summary property edges. The instance set summary graph thus presents the set of instances in a summarized fashion. While navigating the instance set summary graph, the user can select nodes or edges to expand to an instance level of granularity. The selected instance or instances are displayed in instance summary graphs that include summary nodes and edges, which in turn can be selected for expansion.

The summary graphs are presented in the same format as the graphs for the non-summarized data. This allows the summary graphs to be coherently displayed as part of a graph of non-summarized data. Thus a graph is created that contains details of some parts, and summaries of other parts, thereby creating a "fish eye" view. The summary graphs can be encoded for storage in the same format as the graphs of the non-summarized data. In addition, the summary graphs can be queried in the same manner as the non-summarized data. The visualizer may return a summary graph in response to a query that has a summary node that is automatically selected based on the content of the query.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates one embodiment of a method 100 associated with visualizing data with summary graphs that starts at 110. In the described example embodiments, the data is stored as instances, where an instance includes a subject value, a property, and an object value for the property. The method organizes the data for display by identifying an instance subset to be displayed at 120. Of course, depending on the total amount of data, the instance subset may include the entire set of instances. At 130 an instance set summary graph is constructed for display. The instance set summary graph represents the instance subset as an instance summary node having a plurality of property edges connect to the instance summary node. The instance summary node represents the set of subject values for the instances in the instance subset. At 140 the method ends.

In one example embodiment, each property edge in the instance set summary graph includes a count of a number of instances in the instance subset that include the property. In one example embodiment, an object node is attached to a property edge. The attached object node represents the set of object values for that object in the instances in the instance subset. The object node may be labeled with the object value when the object value of the property is the same for all the subjects represented by the instance summary node. In one example embodiment, a histogram may be generated for an object node that summarizes values for the object values represented by the object node.

Figure 5:
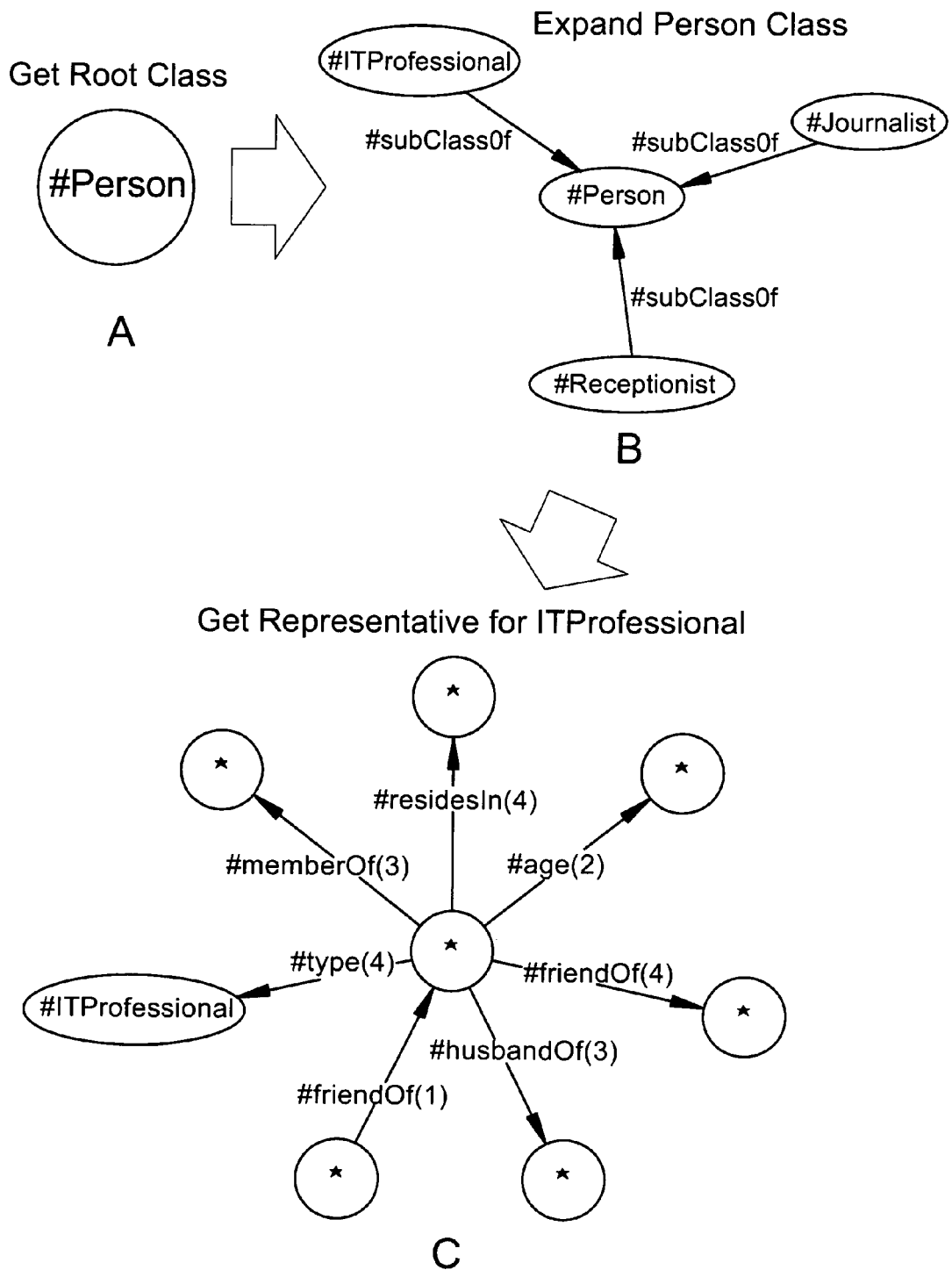
FIG. 5 illustrates a set of example embodiments of summary graphs.

FIG. 5 depicts one embodiment of a series of example summary graphs that illustrate the construction of an instance set summary graph C for a particular class. In particular, subset graph A includes a single node that represents the root class "person". A subset graph B illustrates a subset graph that results from an expansion of the person node. The subset graph B includes all the classes that are associated with "person" class through the "subclassOf" property. As can be seen from FIG. 5, the subclasses of person are "ITProfessional", "Journalist", and "Receptionist".

The instance set (also referred as class representative) summary graph C results from selection of the ITProfessional node in summary graph B. The instance set summary graph C includes a summary node, labeled "*", and the incoming and outgoing properties associated with the summarized instances of "ITProfessional". These properties include "residesIn", "age", "friendOf", "husbandOf", "type", and "memberOf". Each property edge is annotated with an occurrence frequency count of the property over all the instances of the given class thereby summarizing the instance and creating the instance set summary graph C.

Object nodes are connected to each property edge. An object node is labeled with an object value when all of the instances summarized by the instance set summary graph have the same value for that object. For example, the object node "ITProfessional" is labeled in the instance set summary graph C because each summarized instance having the property "type" has the object value "ITProfessional" for "type". Selection of an object node labeled "*" will cause the object values for the attached object node to be displayed, such as, for example, in histogram form.

An instance summary graph can also be constructed. In some cases, the instance summary graph is constructed from an, instance set summary graph by selecting a subject value from those summarized by the summary node. In other cases, the instance set summary graph can be constructed from query results that return instances having subject nodes with a common subject value.

Figure 2:
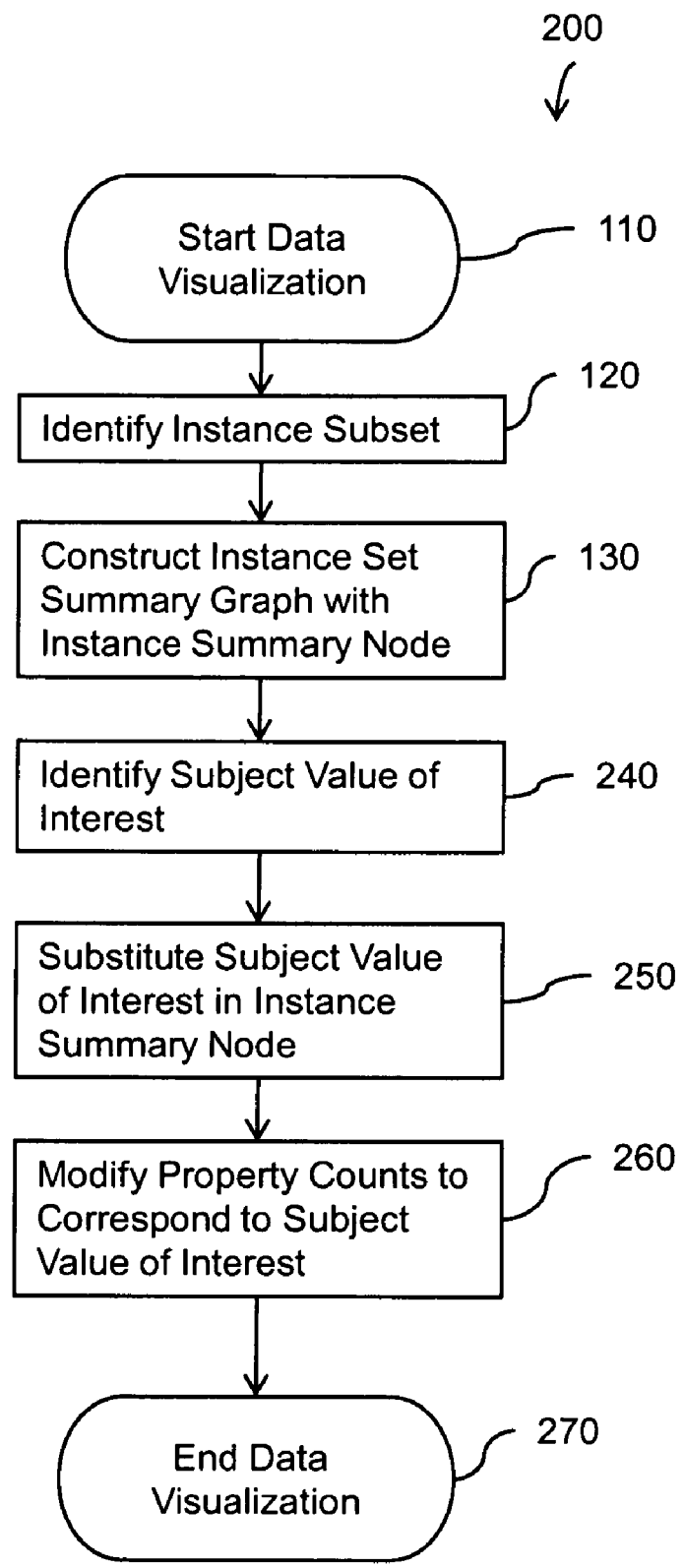
FIG. 2 illustrates one example embodiment of method associated with visualizing data with summary graphs.

FIG. 2 depicts one embodiment of a flow diagram for a method 200 that constructs an instance summary graph from an instance set summary graph. The instance set summary graph is constructed between 110 and 130 as described in connection with FIG. 1. At 240 a subject value of interest is identified in the set of subject values represented by the instance summary node. At 250, the subject value of interest is substituted in the instance summary node. At 260 the property counts in the instance set summary graph are modified to represent a number of times the subject value of interest is associated with the property. At 270 the method ends.

In one example embodiment, an object node is attached to a property edge in the instance summary graph. The object node may be labeled with an object value when the property count is equal to one. The instance summary graph may include a property edge for each property that is present in the instance subset. A property edge having a count greater than one may be expanded to create a property edge and object value pair for each object value for the property in the instance subset.

In various example embodiments, the instance set summary graph and/or the instance summary graph may be connected to a graph that depicts non-summarized instances that are not members of the instance subset.

FIG. 6 depicts an example of an instance set summary graph C (also shown in FIG. 5) being acted on to construct an instance summary graph D. In FIG. 6, the subject value "Jack" is selected from the summary node labeled "*" in the instance set summary graph C. To construct the instance summary graph D, the property counts on each edge are modified to reflect the values for all instances that include "Jack". Properties that are included in the instance set summary graph C but are absent with respect to "Jack" are shown in the instance summary graph D, and have a property count of 0. This results in both the instance set summary graph and the instance summary graph having the same number of edges. In addition, showing the "absent" properties for a given subject communicates the fact that these properties are absent to a user.

Each object node that is attached to a property edge having a count of 1 is labeled, such as "33" for the property edge "age" and "Lowell" for the property edge "residesIn". Property edges that have a property count greater than 1, such as the "friendOf" property edge that projects from "Jack" are expandable. Selection of the property edge "friendOf" will cause the individual property edge and object nodes represented to be displayed as shown in instance summary graph E in FIG. 7 in which "Jill" and "John" nodes are displayed.

Property edges that have property count greater than 1, such as "friendOf" property edge that projects from "Jack" can also be selectively expanded. The property edge "friendOf" could be selected and additional criteria for matching could be specified. For example, it could be specified that only friends that reside in Nashua be displayed. In this case, only the object nodes for friends satisfying this criteria would be displayed. The other friends (if more than 1) would continue to be displayed as a property edge with count greater than one.

The instance set summary graph could be generalized for visualization of a summary for any node. One difference between instance summary and node summary would be that in node summary, the absent edges are not displayed.

While FIGS. 1 and 2 illustrate various actions occurring in serial, it is to be appreciated that various actions illustrated in FIGS. 1-2 could occur substantially in parallel. By way of illustration, a first process could construct an instance set summary graph and a second process could construct an instance summary graph. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes constructing an instance set summary graph and/or an instance summary graph and/or a node summary graph. While executable instructions associated with the above method are described as being stored on a computer-readable medium, it is to be appreciated that executable instructions associated with other example methods described herein may also be stored on a computer-readable medium.

Figure 3A:
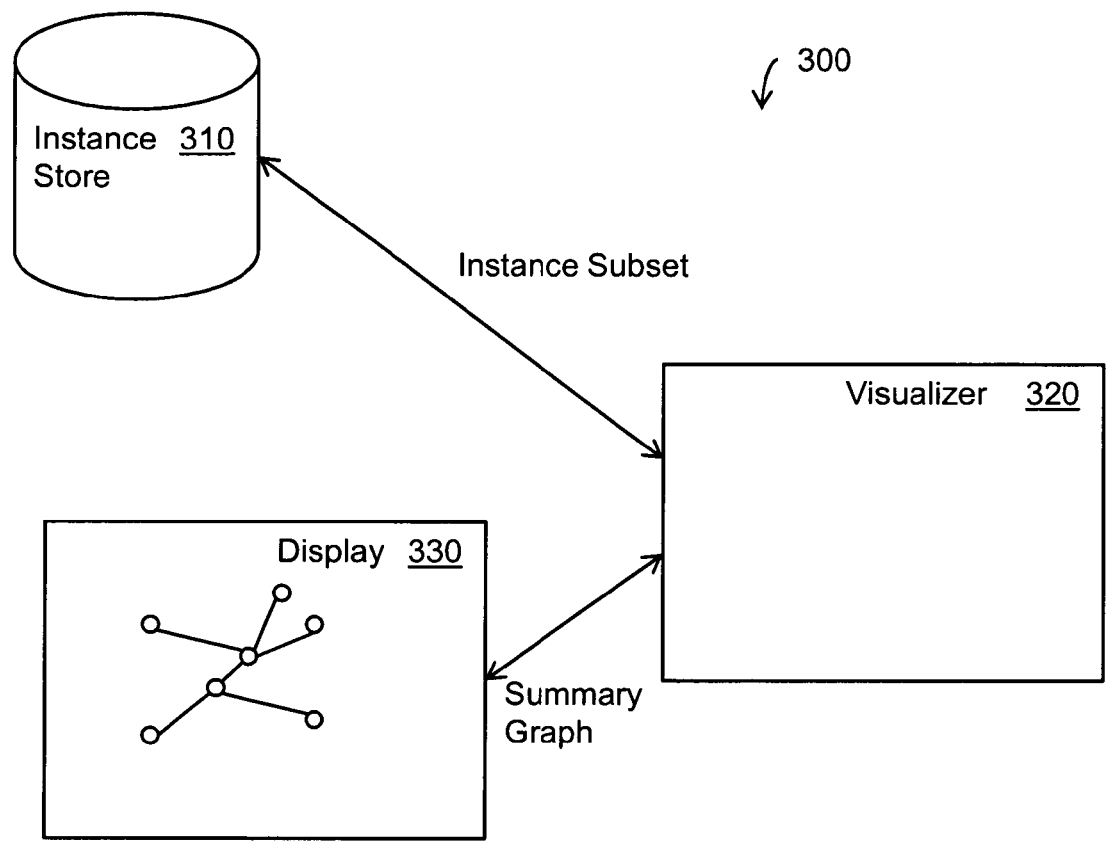
FIGS. 3A and 3B illustrate example embodiments of systems associated with displaying data with summary graphs.

FIG. 3A illustrates one embodiment of a computing system 300 configure to produce data visualization with summary graphs. The computing system 300 includes an instance store 310 that stores instances that include a subject value, a property, and an object value for the target. An instance visualizer 320 constructs an instance set summary graph that represents a subset of instances in the instance store. As described above, the instance set summary graph includes at least one summary subject node having at least one property edge that connects the summary subject node to an object node. Each summary subject node represents the subject values for a set of instances summarized by the summary subject node. The computing system 300 includes a display 330 that displays the instance set summary graph.

Figure 3B:
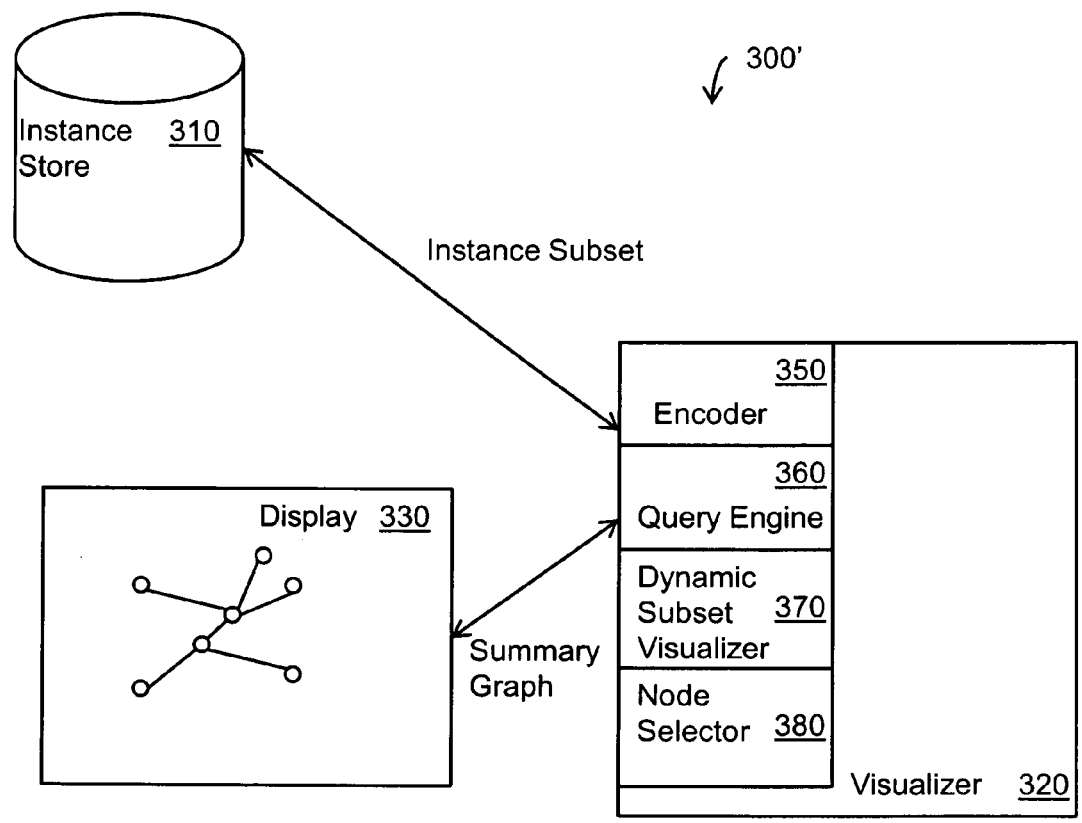

In one example embodiment shown in FIG. 3B the instance store 310 stores instances as a connectivity graph according to a storage configuration in which subject and object nodes are connected by property edges. In this example embodiment the computing system includes a summary graph encoder 350 that encodes summary graphs in the storage configuration. The encoder 350 encodes the summary graph according to the format used for un-summarized data using blank nodes and additional properties.

Figure 9A:
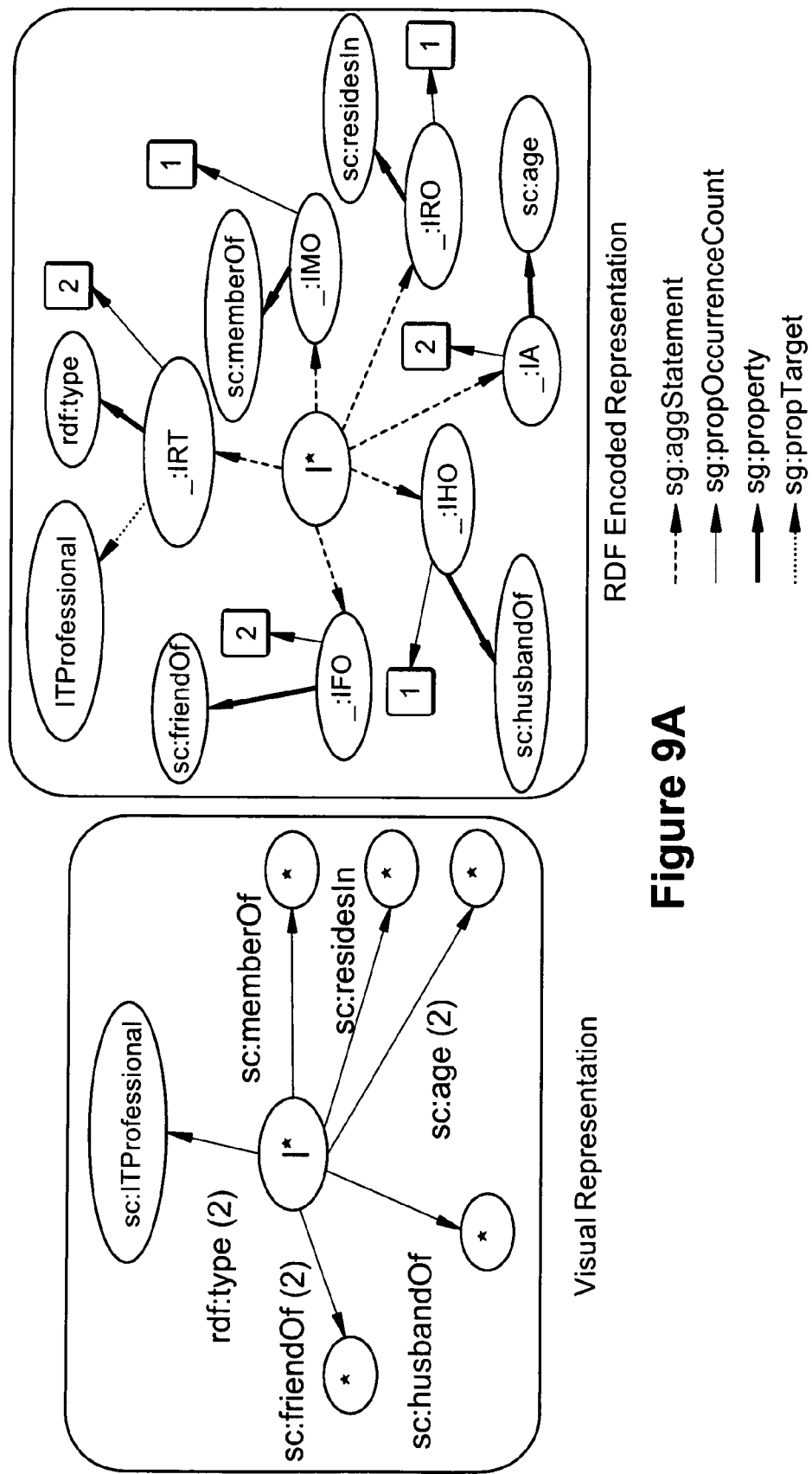
FIGS. 9A and 9B illustrate another set of example embodiments of summary graphs.
Figure 9B:
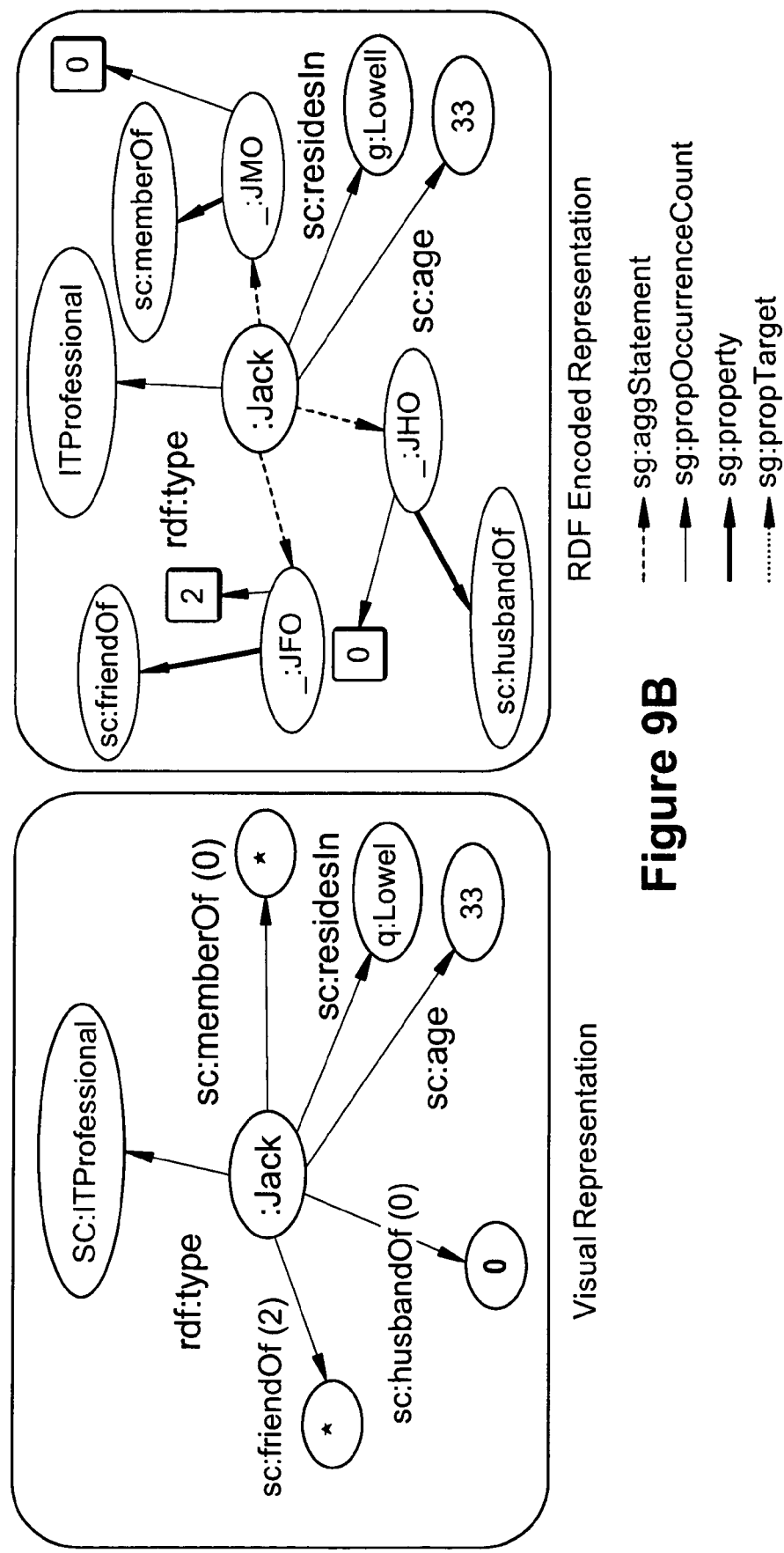

Turning now to FIGS. 9A and 9B, example embodiments of a summary graph namespace is illustrated in graphic form. The summary graph namespace is created for the purpose of encoding summary graphs: sg:aggStatement (to refer to a blank node denoting the aggregated edge); "sg:property" (to refer to a property); "sg:propOccurrenceCount" (to refer to a property count); and "sg:propTarget (to refer to a property target) are defined. Properties for object value lower and upper bounds are also defined and are annotated "sg:propValLowerBound" (including bound) and "sg:propValUpperBound" (excluding bound).

FIG. 9A shows an encoded representation B of an instance set summary graph A. The summary node "*" in the encoded representation B is surrounded by additional summary graph encoding property edges and summary graph encoding object nodes that are created for the purpose of encoding. These encoding property edges and object nodes are disposed between the summary node and the property edges and object nodes of the instance set summary graph.

FIG. 9B shows an encoded representation D of an instance summary graph C. The selected subject "Jack" is shown in the central node. Summary graph encoding property edges and encoding object nodes are present for each property having a property count not equal to 1. Instances having a property count of 1 are encoded directly, without the use of summary graph encoding property edges and object nodes.

With reference again to the embodiment shown in FIG. 3B, the visualizer 320 includes an instance set summary query engine 360 that executes queries on the instances summarized by the instance set summary graph. The query engine queries the summarized data using the summary graph namespace defined above.

In one example embodiment shown in FIG. 3B the visualizer includes a dynamic subset visualizer 370 that constructs an instance set summary graph that represents the results of a query on the instance store. The dynamic subset visualizer 370 includes a summary subject node selector 380 that selects a summary node for the instance set summary graph based on the query. The dynamic subset visualizer transforms the results to a user query into an instance set summary graph. The summary subject node selector selects a summary subject node by augmenting a user query that specifies a focal point with a group by command on the focal point. This results in a focused instance set summary graph that efficiently displays the query results and can be computed with an interactive response time.

Figure 4A:
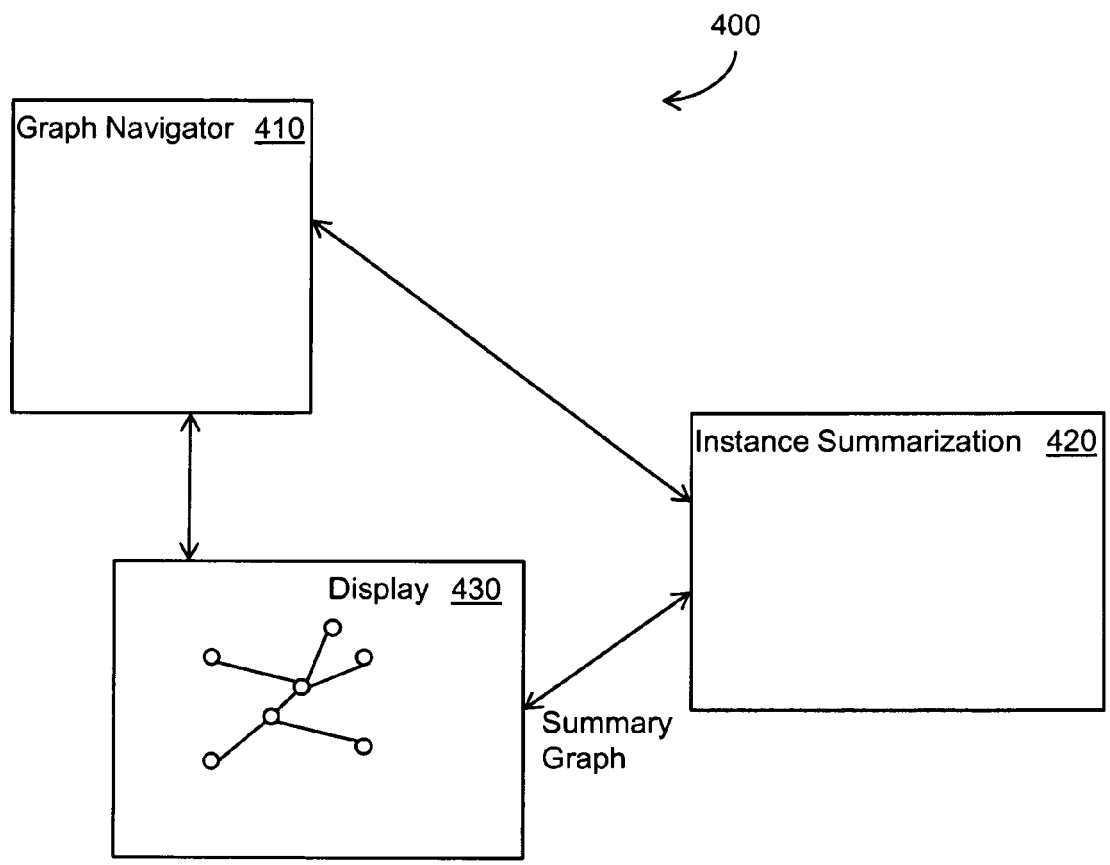
FIGS. 4A and 4B illustrate example embodiments of systems associated with navigating summary graphs.

FIG. 4A is a functional block diagram of one embodiment of a visualizer 400 for displaying data stored as instances that include a subject value, a property, and an object value for the property. The visualizer 400 includes a display 430 configured to display graphs that include subject and target object nodes connected by property edges. An instance summarization module 420 constructs an instance set summary graph for a subset of instances. The instance set summary graph includes a summary subject node that replaces a plurality of subject nodes from the subset of instances. Property edges representing each property edge in the subset of instances are connected at a first end to the summary subject node. An object node is connected to a second end of each property edge. Each object node replaces a corresponding subset of object nodes for the property in the subset of instances.

A graph navigator 410 allows a user to expand and summarize the various components of the graph. For example, the graph navigator allows the selection of a plurality of subject nodes to be replaced by the summary subject node as seen in FIG. 5 instance set summary graph C. In one example embodiment, the graph navigator is configured to allow selection of a property edge. Selection of the property edge causes the object values for the selected property edge to be displayed.

Figure 8:
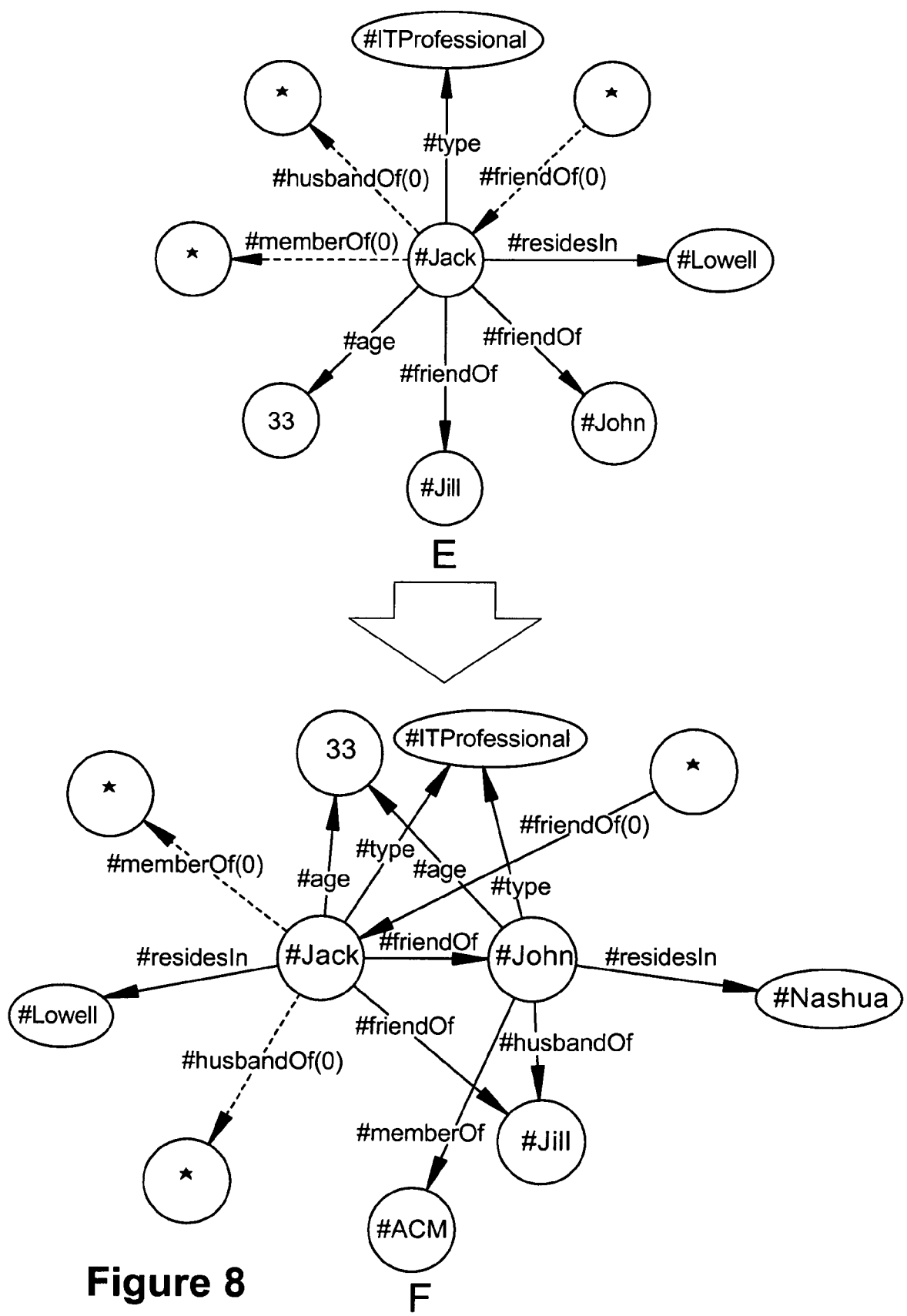
FIG. 8 illustrates another set of example embodiments of summary graphs.

In one example embodiment, graph navigator 410 is configured to allow selection of a subject value for one of the subject nodes replaced by the summary subject node as seen in FIG. 6 instance summary graph D. The selected subject node having the selected subject value is substituted for the summary subject node. In this manner, the instance summary graph is constructed that depicts the selected subject node and properties connected to the selected subject node. In one example embodiment, the graph navigator is configured to allow selection of an object node. Selection of the object node causes property values and objects for the selected object node to be displayed. Hence the graph navigator generates a node summary graph about the selected object node. The instance summary graph along with the node summary graph for the object node "John" forms a hybrid graph F as shown in FIG. 8. Hybrid graph F results when the object node "John" is selected in instance summary graph E.

The graph navigator 410 thus allows a user to select nodes and edges for summarization and expansion to create a custom graphical display with portions that represent summarized data and other portions that represent un-summarized data.

Figure 4B:
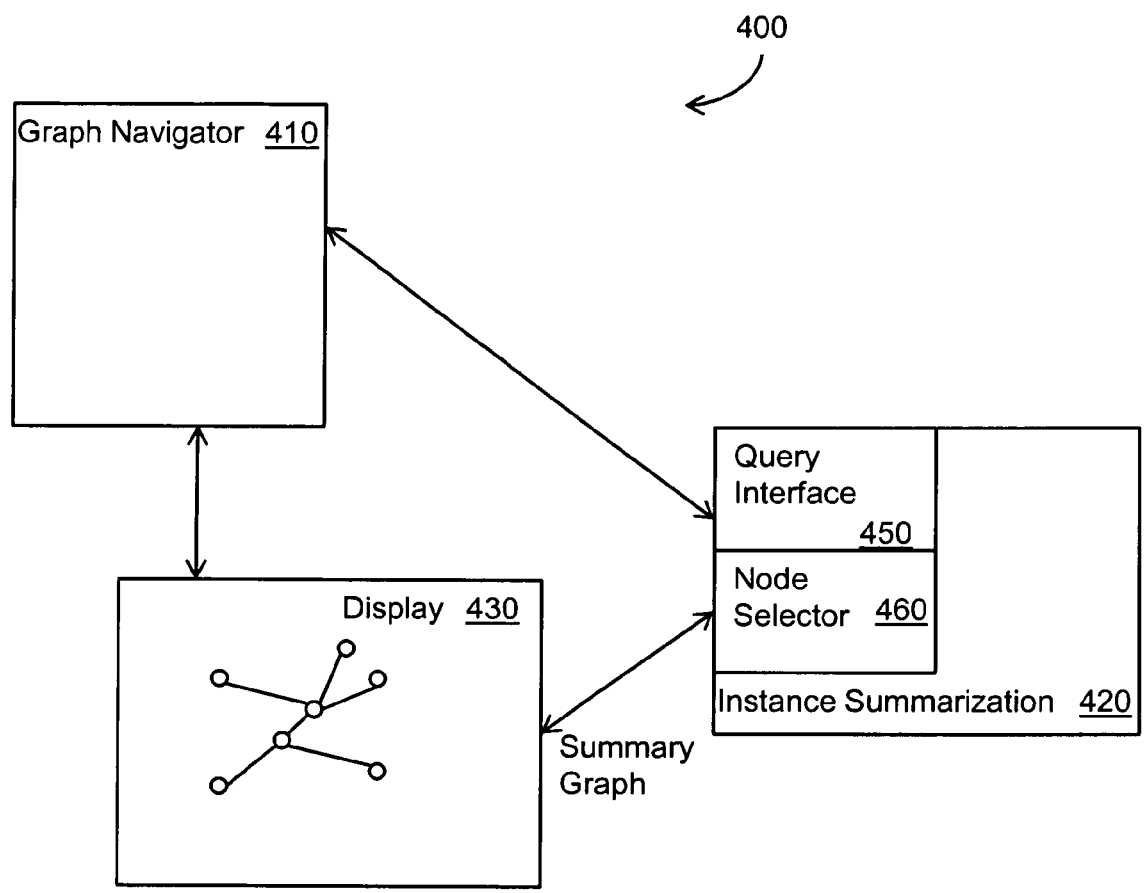

In one example embodiment shown in FIG. 4B, the instance summarization module 420 includes an instance set summary graph query interface 450 that is configured to accept a query for execution on instances represented by a displayed instance set summary graph. The graph query interface configured to display a query result summary graph that represents the instances returned by the query. The query interface includes a summary node selector 460 that selects a subject summary node for the query result summary graph based on the query.

Figure 10:
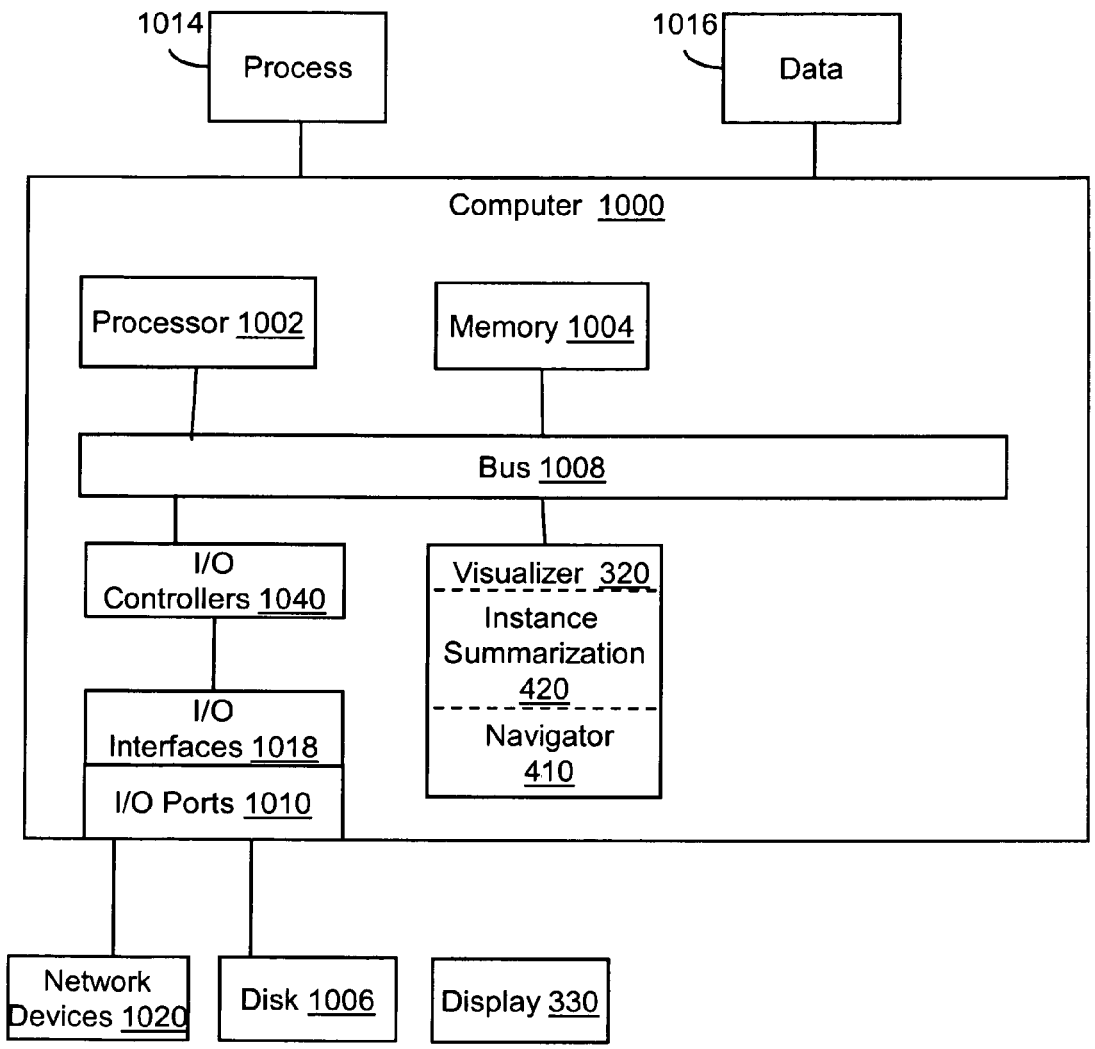
FIG. 10 illustrates an example embodiment of a computing environment in which example systems and methods, and equivalents, may operate.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a visualizer 320 (also shown in FIGS. 3A and 3B) configured to facilitate visualizing data with summary graphs. In different examples, the visualizer includes an instance summarization module 420 and/or a graph navigator 410 (also shown in FIGS. 4A and 4B). In different examples, the visualizer 320, instance summarization module 420, and graph navigator 410 may be implemented in hardware, software, firmware, and/or combinations thereof. While the visualizer 320 is illustrated as a hardware component attached to the bus 1008, it is to be appreciated that in one example, the visualizer 320 could be implemented in the processor 1002.

Thus, the visualizer 320 may provide means (e.g., hardware, software, firmware) for visualizing data with summary graphs.

The means may be implemented, for example, as an ASIC programmed to organized data for display with summary graphs. The means may also be implemented as computer executable instructions that are presented to computer 1000 as data 1016, such as, for example, the instance store 310 in FIG. 3A, that are temporarily stored in memory 1004 and then executed by processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, the display 330 (also shown in FIG. 3), the disk 1006, and so on. The input/output ports 1010 may include, for example, serial ports, parallel ports, and USB ports.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method that organizes for display data stored as instances, where an instance includes a subject value, a property, and an object value for the property, the computer-implemented method comprising:
   identifying an instance subset;
   constructing an instance set summary graph for display, the instance set summary graph representing the instance subset as an instance summary node having a plurality of property edges connected to the instance summary node, where a property edge includes a property count of a number of instances in the instance subset that includes the property;
   where the instance summary node represents the set of subject values for the instances in the instance subset;
   connecting the instance set summary graph to a graph that depicts non-summarized instances that are not members of the instance subset; and
   constructing an instance summary graph, where constructing an instance summary graph comprises:
     identifying a subject value of interest from the set of subject values represented by the instance summary node;
     substituting the subject value of interest in the instance summary node; and
     modifying the property counts to represent a number of times the subject value of interest is associated with the property.

2. The computer-implemented method of claim 1, where the instance set summary graph comprises a node summary graph in which property edges having an occurrence count of zero are not displayed.

3. The computer-implemented method of claim 1, further comprising attaching an object node to a property edge, the object node representing the set of object values for a corresponding object in the instances in the instance subset.

4. The computer-implemented method of claim 3, further comprising labeling the object node with the object value when the object value of the property is the same for all the subjects represented by the instance summary node.

5. The computer-implemented method of claim 3, comprising generating a histogram that summarizes values for the object values represented by the object node.

6. The computer-implemented method of claim 1, where the instance summary graph further comprises attaching an object node to a property edge.

7. The computer-implemented method of claim 6, where the instance summary graph further comprises labeling the object node with an object value when the property count is equal to one.

8. The computer-implemented method of claim 1, where the instance summary graph further comprises including a property edge for each property that is present in the instance subset.

9. The computer-implemented method of claim 1, where the instance summary graph further comprises connecting the instance summary graph to a graph that depicts non-summarized instances that are not members of the instance subset.

10. The computer-implemented method of claim 1, where the instance summary graph further comprises expanding a property edge having a count greater than one to create a property edge and object value pair for each object value for the property in the instance subset.

11. The computer-implemented method of claim 1, further comprising displaying the instance set summary graph.

12. The computer-implemented method of claim 1, where the instance summary graph further comprises displaying the instance summary graph.

13. The computer-implemented method of claim 3, comprising selectively displaying objects nodes that meet a selection criteria.

14. A computing system comprising:
    an instance store that stores instances that include a subject value, a property, and an object value for the target, where the instance store is a memory;
    an instance visualizer that constructs an instance set summary graph that represents a subset of instances in the instance store, the instance set summary graph including at least one summary subject node having at least one property edge that connects the summary subject node to an object node, where a property edge includes a property count of a number of instances in the instance subset that includes the property, where each summary subject node represents the subject values for a set of instances summarized by the summary subject node and connects the instance set summary graph to a graph that depicts non-summarized instances that are not members of the instance subset, and constructing an instance summary graph, where constructing an instance summary graph comprises identifying a subject value of interest from the set of subject values represented by the instance summary node, substituting the subject value of interest in the instance summary node, and modifying the property counts to represent a number of times the subject value of interest is associated with the property; and
    a display that displays the instance set summary graph and the graph.

15. The computing system of claim 14, where the instance store stores instances as a connectivity graph according to a storage configuration in which subject and object nodes are connected by property edges, and where the computing system comprises an instance set summary graph encoder that encodes the instance set summary graph in the storage configuration.

16. The computing system of claim 14, where the instance visualizer includes an instance set summary query engine that executes queries on the instances summarized by the instance set summary graph.

17. The computing system of claim 14, where the instance visualizer includes a dynamic subset visualizer that constructs an instance set summary graph that represents the results of a query on the instance store and further where the dynamic subset visualizer includes a summary subject node selector that selects a summary node for the instance set summary graph based on the query.

18. A visualizer for displaying data stored as instances that include a subject value, a property, and an object value for the property, the visualizer comprising:
- a display screen configured to display graphs that include subject and target object nodes connected by property edges;
- an instance summarization module configured to construct an instance set summary graph for a subset of instances, the instance set summary graph including a summary subject node that replaces a plurality of subject nodes from the subset of instances, property edges representing each property edge in the subset of instances connected at a first end to the summary subject node, and an object node connected to a second end of each property edge, each object nodes replacing a corresponding subset of object nodes for the property in the subset of instances; and
- a graph navigator configured to allow selection of a plurality of subject nodes to be replaced by the summary subject node and allow selection of a subject value for one of the subject nodes replaced by the summary subject node, where a selected subject node having the selected subject value is substituted for the summary subject node such that an instance summary graph is constructed that depicts the selected subject node and properties.

19. The visualizer of claim 18, the graph navigator is configured to allow selection of a property edge, where selection of the property edge causes the object values for the selected property edge to be displayed.

20. The visualizer of claim 18, where the graph navigator is configured to allow selection of an object node, where selection of the object node causes property values and objects for the selected object node to be displayed.

21. The visualizer of claim 18, where the graph navigator is configured to receive an input selection criteria and to selectively display objects nodes that meet a selection criteria.

22. The visualizer of claim 18, further comprising an instance set summary graph query interface configured to accept a query for execution on instances represented by a displayed instance set summary graph, the graph query interface configured to display an query result summary graph that represents the instances returned by the query.

23. The visualizer of claim 22, where the query interface further comprises a summary node selector that selects a subject summary node for the query result summary graph based on the query.

24. A computer-readable medium storing computer-executable instructions that when executed by a computer cause the computer to perform a method that organizes for display data stored as instances, where an instance includes a subject value, a property, and an object value for the property, the method comprising:
- identifying an instance subset;
- constructing an instance set summary graph for display, the instance set summary graph representing the instance subset as an instance summary node having a plurality of property edges connected to the instance summary node;
- where the instance summary node represents the set of subject values for the instances in the instance subset; and
- constructing an instance summary graph by:
    - identifying a subject value of interest from the set of subject values represented by the instance summary node;
    - substituting the subject value of interest in the instance summary node; and
    - modifying the property counts to represent a number of times the subject value of interest is connected to the property.

25. The computer-readable medium of claim 24, where the instructions include labeling each property edge with a count of a number of instances in the instance subset that includes the property.

26. The computer-readable medium of claim 24, where the instructions include attaching an object node to a property edge, the object node representing the set of object values for the instances in the instance subset.

* * * * *

UNITED STATES PATENT AND TRADEMARK OFFICE
CERTIFICATE OF CORRECTION

PATENT NO. : 8,126,926 B2  
APPLICATION NO. : 12/317362  
DATED : February 28, 2012  
INVENTOR(S) : Atre et al.

Page 1 of 1

It is certified that error appears in the above-identified patent and that said Letters Patent is hereby corrected as shown below:

IN THE DRAWINGS

On sheet 7 of 13, in figure 5, line 4, delete "#subClass0f" and insert -- #subClassOf --, therefor.

On sheet 7 of 13, in figure 5, line 4, delete "#subClass0f" and insert -- #subClassOf --, therefor.

On sheet 7 of 13, in figure 5, line 6, delete "#subClass0f" and insert -- #subClassOf --, therefor.

In column 4, line 41, delete "5,the" and insert -- 5, the --, therefor.

In column 11, line 38, in Claim 19, after "claim 18," insert -- where --.

Signed and Sealed this  
Twenty-ninth Day of May, 2012

David J. Kappos  
*Director of the United States Patent and Trademark Office*